United States Patent [19]
Buriani et al.

[11] Patent Number: 5,526,736
[45] Date of Patent: Jun. 18, 1996

[54] APPARATUS FOR PRODUCING READY-TO-EAT COOKED FOODS

[75] Inventors: Ernesto Buriani, Reggio Emilia; Sergio Veronesi, Cinisello Balsamo-Milano; Camillo Catelli; Roberto Notari, both of Parma, all of Italy

[73] Assignee: Barilla G. e R. F.lli - Societa per Azioni, Parma, Italy

[21] Appl. No.: 406,193

[22] Filed: Mar. 16, 1995

[30] Foreign Application Priority Data

Jul. 4, 1994 [IT] Italy ................. MI94A1393

[51] Int. Cl.⁶ ........................................ A23L 3/00
[52] U.S. Cl. ................ 99/470; 99/355; 99/367; 99/443 C; 426/511; 426/521; 426/523
[58] Field of Search ................. 426/521, 523, 426/524, 511; 99/470, 355, 360, 367, 370, 443 C

[56] References Cited

U.S. PATENT DOCUMENTS

| | | | |
|---|---|---|---|
| 4,661,325 | 4/1987 | Noro et al. | 99/470 |
| 5,422,130 | 6/1995 | Fox et al. | 99/470 |
| 5,431,936 | 7/1995 | Leger | 99/355 |

*Primary Examiner*—George Yeung
*Attorney, Agent, or Firm*—Seed and Berry

[57] ABSTRACT

An apparatus plant is described which includes a continuous autoclave (1) for the heat treatment of foods measured into open containers (9) loaded onto trays (12) which are advanced through the autoclave (1) by a stepping conveyer (38). A cooling chamber (6) communicates at one end with the autoclave (1) through an air-lock tunnel (7) and at the other with a sterile assembly for sealing the containers (9) full of cooked food.

20 Claims, 8 Drawing Sheets

APPARATUS FOR PRODUCING READY-TO-EAT COOKED FOODS

TECHNICAL FIELD

The present invention relates, in general, to a plant for the production and subsequent packaging of long-life, ready-to-eat cooked foods.

In particular, this invention relates to a plant for the heat stabilisation and/or sterilisation and for the cooking of food products in general, measured into open containers which are finally sealed to provide so-called long-life ready meals.

BACKGROUND OF THE INVENTION

In general, when preparing ready meals of the type considered it is necessary to satisfy a dual requirement, that is, on the one hand to ensure that the product remains non-toxic for longer than the declared long-life period and, on the other, to keep the physical and organoleptic qualities of the product (ready meal) as close as possible to those of the same dish fleshly prepared.

To this end, the prior art provides numerous processes which may be divided into two groups, each based on a different method of administering the heat for carrying out the stabilisation/sterilisation and cooking operations, namely:

1) processes which use electromagnetic energy (in particular microwaves or infrared radiation) to provide the heat, and
2) processes which use steam and/or a cooking liquid (for example water, oil and the like).

One technique of the second group is taught, for example, by U.S. Pat. No. 4 882 191 which describes a process for the continuous preparation of ready meals based on pasta. This process provides for a sequence of operations (sterilisation by steam, cooking in water, straining, cooling) carried out in a sterile environment on pasta measured into open containers which are then sealed, also in a sterile environment, following the possible addition of a condiment.

In other processes of the second group, aimed in particular at the preparation of ready meals based on meat, fish, vegetables and the like, where no cooking liquid is used, there is obviously no straining step; in yet other processes the cooking liquid is also used to stabilise and/or sterilise the product and the container.

In order to carry out such processes, the prior art provides an equally numerous selection of equipment, the structural and operating characteristics whereof are so specialised that, in general, not only is it not possible to use the same plant for two different processes but it is equally impossible to carry out this same process on two different products, even if they belong to a same product family. This rule is especially true when the selected process is required to be continuous.

It is known that, in order to obtain optimum products both from an organoleptic point of view and from that of the product-life, it is necessary to use different processing temperatures and times as well as different pressures, volumes of liquid and the like, not only for products of a different nature (such as, for example, pasta, vegetables and meat) but also for similar products, such as pasta products which differ in thickness, dimensions, weight, consistency and shape.

It is therefore understandable that the rigid restrictions imposed by the use of prior art apparatus constitute a serious problem for all companies involved in the production of ready meals spread across a broad range of basic products. A few attempts have been made to adapt existing plants to a variety of ready meals but have led to considerable complications in the structure and operation of such plants and have produced products which are not entirely satisfactory from an organoleptic point of view.

The problem forming the basis of this invention is that of designing and providing a plant for the heat-stabilisation and/or sterilisation and cooking of food products in general which has structural and operating characteristics such as to enable it to be used to advantage to produce so-called ready meals based on a variety of products, differing by nature, weight, consistency, dimensions and shape, while at the same time enabling all operating steps to be controlled precisely and automatically.

This problem is solved according to the invention by a plant of the type considered, the characteristics whereof are indicated in Claim 1 which follows.

The advantages and characteristics of this invention will become more apparent from the detailed description of one embodiment thereof, given by way of example with reference to the appended drawings, provided purely by way of non-limitative example.

DETAILED DESCRIPTION OF THE INVENTION

Essentially, a plant according to the present invention includes a first body 1, essentially a cylindrical autoclave, having a horizontal axis A and defining a processing chamber 2 in which all heat treatments may be carried out on the food products forming the basis of the ready meals (for example pasta, vegetables, fish, meat and the like) so as to stabilise, sterilise, cook and strain them should a cooking liquid have been used.

The end of the processing chamber 2 for the input of dishes to be processed and the end for the output of processed dishes are indicated 3 and 4 respectively. The processing chamber 2 is generally a pressurised-steam chamber and is always kept in sterile conditions.

A second body 5, also cylindrical and having a horizontal axis A' parallel to the axis A is arranged downstream of the body 1 and defines a cooling chamber 6 for the processed dishes; this chamber 6 is fitted, as will become clear later in this description, with devices for adding any secondary (but no less important) ingredients to the ready meals, such as, for example, various condiments, sauces, creams and the like. This cooling chamber 6, which is strictly sterile, has an inlet end 6a and an outlet end 6b. The inlet end 6a communicates with the processing chamber 2 through a dish-transfer tunnel 7, also kept sterile and having an axis C perpendicular to the axes of the bodies 1 and 5. This tunnel 7 is essentially an air-lock chamber which enables dishes to be transferred without any substantial variation in the conditions in either the processing chamber 2 or the cooling chamber 6.

Near the inlet end 3 of the processing chamber 2, the plant according to the present invention includes a station 8 for the preparation of the dishes to be processed and for the arrangement of a plurality of these dishes on individual supports.

Figures 3, 9:
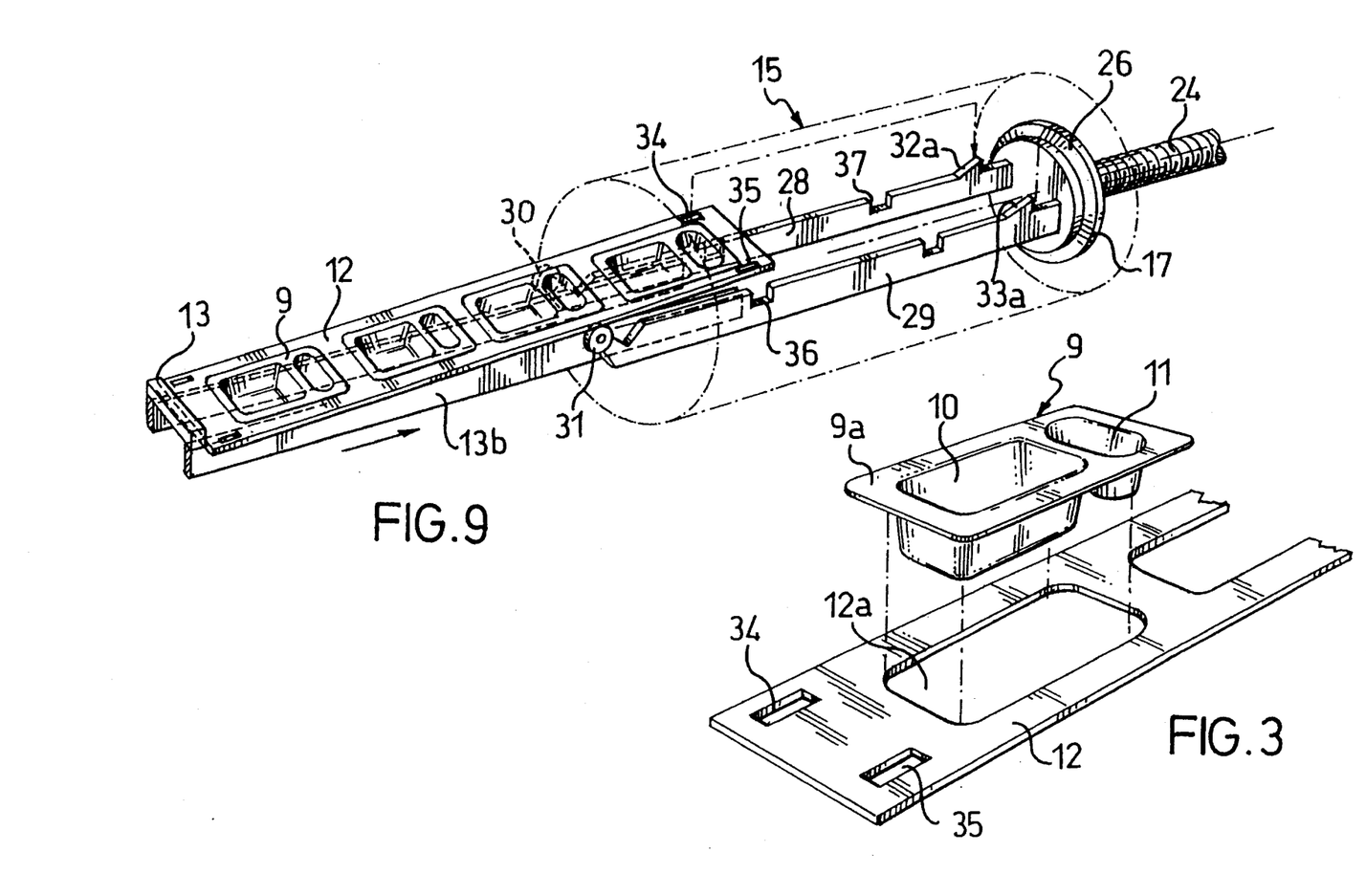
FIG. 3 is an enlarged perspective view of details of the plant of the invention.
FIG. 9 is an enlarged perspective view of the same transfer means in the stage of FIG. 6.
Figures 4, 5, 6:
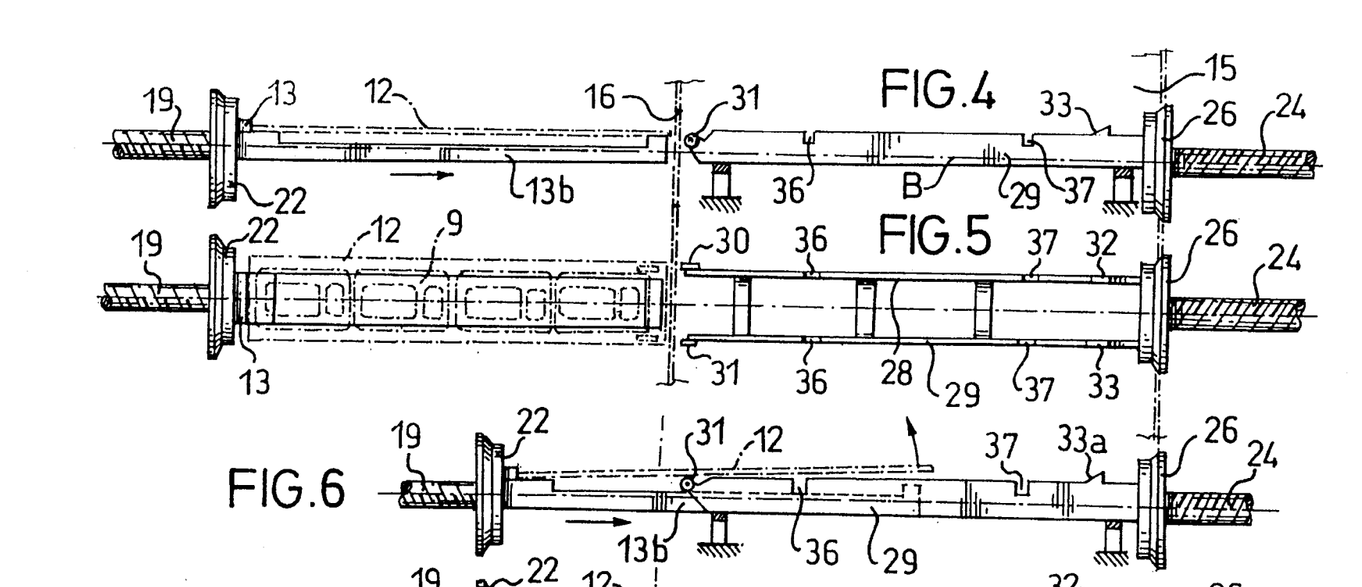
FIGS. 4 to 8 are schematic side and plan views of the means for transferring the food products to be pasteurised and cooked into the processing chamber.
Figures 7, 8:
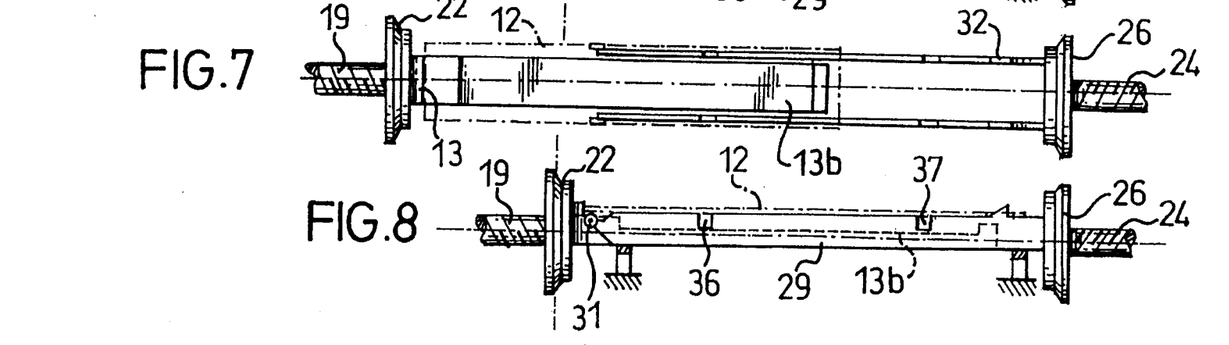

In the preferred but non-limitative embodiment of FIG. 3, the dishes include a dished container 9 with a flat, outwardly-projecting peripheral border 9a; in particular, the containers 9 are of the type having two compartments 10, 11 of different capacities, for example one for the pasta and one for the sauce, while the supports are constituted by rectangular trays 12 having as many windows 12a as containers 9 to be carried by each tray. In the embodiment illustrated, the trays 12 are dimensioned to accommodate a line off our containers 9; it is of course possible, and in some case advantageous, to use trays dimensioned to accommodate a plurality of lines of containers 9.

A reception chamber for the trays 12 and respective containers 9 is schematically indicated 14. In particular, this chamber 14 is constructed and dimensioned to accommodate one tray 12 at a time.

The tray-reception chamber 14 extends to one side of the body 1 along an axis B perpendicular to the axis A thereof and communicates with the inlet region 3 of the processing chamber 2 through an air-lock chamber 15. This air-lock chamber 15 extends coaxially of the tray-reception chamber 14 and is dimensioned to accommodate one tray at a time, arranged along its axis B. In particular (FIG. 2) the air-lock chamber 15 communicates at one end with the tray-reception chamber 14 through a first circular aperture 16, formed as a valve seat, and at the other end with the inlet region 3 of the processing chamber 2 through a second circular aperture 17, also formed as a valve seat.

A first lead-screw assembly, generally indicated 18 and comprising a screw 19 and a rotatable threaded sleeve element 20, is supported along the axis B outside the tray-reception chamber 14, at the opposite end thereof from that opening to the air-lock chamber 15.

In this assembly 18, the sleeve element 20 is supported for rotation and is rotated by a motor which is not shown as it is entirely conventional. The screw 19 moves only axially and has an obturator disc 22 at one end, arranged inside the tray-reception chamber 14. This obturator disc 22 is structured and dimensioned to cooperate with the valve seat aperture 16 so as to seal the air-lock chamber 15 hermetically.

A second lead-screw assembly, generally indicated 23 and comprising a screw 24 and sleeve element 25, is identical to the previous assembly and is also supported along the axis B, outside the body 1, at the end thereof opposite the air-lock chamber 15.

In the assembly 23, the rotatably supported sleeve element 25 is rotated by a respective motor which is not shown as it is entirely conventional, while the screw 24, which moves only axially, extends through the cylindrical wall of the body 1 with interposed seal means which are not shown. An obturator disc 26 is coaxially fixed to the end of the screw 24 inside the body 1 and is structured and dimensioned so as to engage the aperture-valve seat 17 and to seal the air-lock chamber 15 hermetically.

A pair of horizontal, parallel tines 13a, 13b, mutually reinforced by a plurality of cross members 13c, is fixed to the face of the obturator disc 22 facing the aperture 16 of the air-lock chamber 15, the tines being intended to support a tray 12. An abutment projection 13 is provided between the obturator disc 22 and the tines 13a, 13b for pushing and positioning the trays. The obturator disc 22 and the tines 13a, 13b essentially constitute a pusher-arm for supporting and advancing the trays 12 along the axis B towards and into the air-lock chamber 15, as will become clearer in the description below.

The ends of a respective pair of horizontal, parallel tines 28, 29, substantially the same length as the trays 12, are fixed to the face of the obturator disc 26 facing the aperture 17 of the air-lock chamber 15. In the embodiment illustrated by way of example, these tines 28, 29 are spaced by a distance greater than the distance between the tines 13a, 13b of the pusher arm with which they are intended to cooperate. These pairs of tines 13a, 13b—28, 29 are coplanar; in a preferred but not limitative embodiment, the tines 28, 29 are constituted by flat, rectangular profiled sections arranged on their edges like a blade. The tines 28, 29 are wider than the tines 13a, 13b so that their upper edges are slightly higher than the upper edges of the latter.

The free ends of the tines 28, 29 (FIGS. 4 to 9) support respective idle rollers 30, 31 having horizontal axes of rotation perpendicular to the tines themselves. The diameters of the rollers 30, 31 and the positions of their axes are chosen to ensure that the rollers project above the upper edges of the respective tines 28, 29.

Near the obturator disc 26, the tines 28, 29 have identical teeth 32, 33 shaped like the teeth of a saw and arranged with their inclined (or dorsal) edges 32a, 33a facing the free ends of the tines themselves. These teeth 32, 33 are adapted to engage corresponding slots 34, 35 in the short sides of the trays 12 (FIG. 3).

Each of the tines 28, 29 also has two identical notches 36, 37 of predetermined width with their longer sides vertical and opening into the upper edges of the tines themselves; these notches are spaced by a predetermined longitudinal distance. The notches 36 of the tines 28, 29 are aligned in a direction perpendicular to the tines (as are the notches 37).

Figure 10:
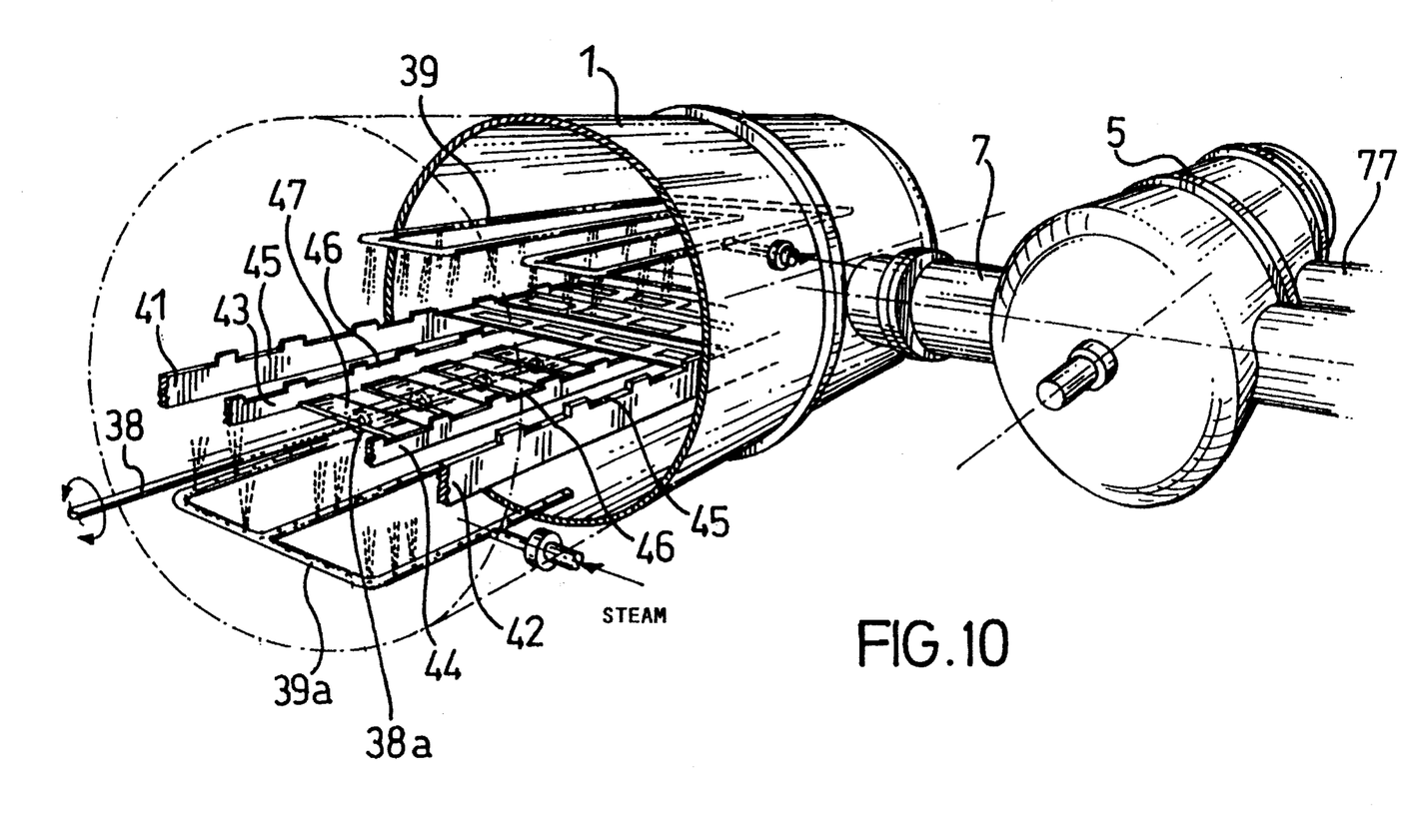
FIG. 10 is an enlarged perspective view of a detail of the plant of FIG. 1, seen from inside the processing chamber.

A horizontal conveyor of the type known as a stepping conveyor, generally indicated 40 (FIGS. 1, 2, 10), extends longitudinally through the processing chamber 2 of the body 1, preferably in a diametral plane thereof, and is supported by conventional means, not shown.

In a preferred embodiment, this conveyor includes a first pair of mutually spaced, flat profiled members 41, 42 supported on their edges and extending from the inlet end 3 to the outlet end 4 of the processing chamber 2; a second pair of movable flat profiled members 43, 44 are supported on their edges between the profiled sections 41, 42. Identical pluralities of rectangular recesses 45, 46 (FIG. 10) are formed in the upper edges of the fixed and movable profiled sections 41, 42 and 43, 44, each having a length and depth equal to the width and depth respectively of the trays 12 so as to engage them transversely, as will be seen later in this description.

The movable profiled members 43, 44 are of such a thickness that they can slidably engage the notches 36, 37 in the tines 28, 29 and are mutually connected by a plurality of cross-members 47 so as to form a movable rigid frame.

This movable frame is connected by a drive transmission to equipment which can drive its movement in the "rectangular" path required to advance the conveyor 40 stepwise.

With reference to the fixed profiled members 41, 42, this rectangular movement includes:

a horizontal movement into a position in which the movable profiled members 43, 44 engage the notches 36, 37 in the tines 28, 29, passing under the respective tray 12;

a vertical upward movement so as to lift the tray 12 off the tines 28, 29;

a horizontal movement away from the said tines and finally, a vertical downward movement returning to the starting position, simultaneously delivering the collected tray 12 to the fixed profiled members 41, 42.

Since equipment of the type described above, and the transmission means connecting it to the movable frame are known per se they are neither described nor illustrated in detail. By way of example, a shaft 38 (FIGS. 1 and 10) provided to drive the vertical movements of the movable frame is driven by drive means 38b and has a plurality of cams 38a with suitable profiles which engage respective projections of the frame itself, for example the cross-members 47 thereof. For the horizontal movements of the movable frame, the shaft 38 may be connected to a lead-screw assembly (HD) arranged outside the body 1 along the same axis.

Ducts 39 and 39a for delivering cooking liquid, for example hot (boiling) water and steam, are supported along the inside of the processing chamber 2, the former above and the latter below the conveyor 40. More particularly, the ducts 39a for delivering steam (used to pasteurise and/or sterilise the foods measured into the containers 9) extend from the inlet end 3 of the chamber 2 to an intermediate position therein. The ducts 39 for delivering water (or any other liquid and/or fluid used for cooking) extend almost to the outlet region 4 of the chamber 2. In particular, these ducts 39 constitute essentially manifolds for the cooking liquid and are provided with devices for metering this liquid, the positions of which may be varied along the manifolds so as to vary the cooking time.

Figure 11:
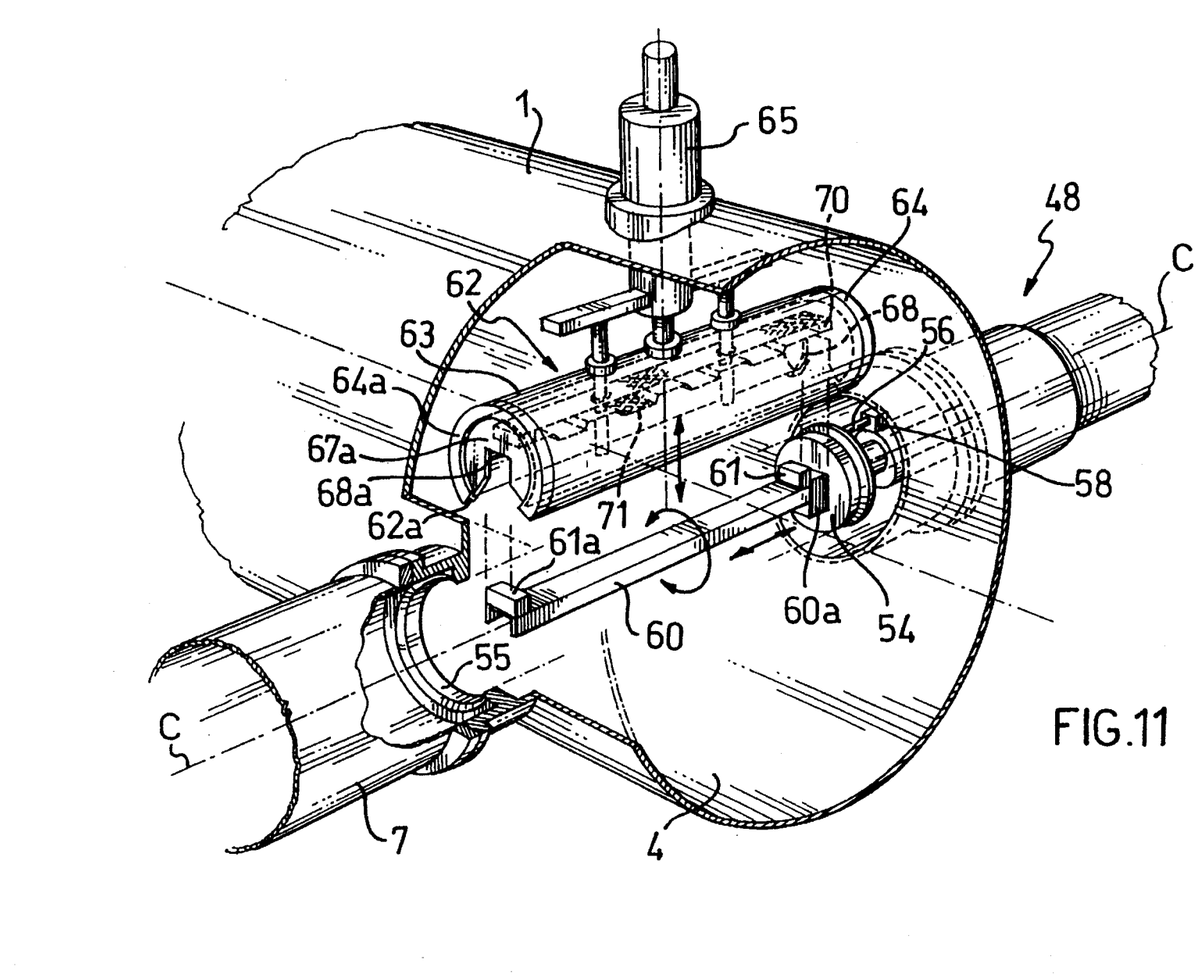
FIG. 11 is a perspective view of a device according to the invention for overturning dishes to strain them.

In the outlet region 4, a control assembly 48 is fixed to the outside of the body 1 for overturning the containers to strain them when this operation is necessary, as will be seen later in this description. This assembly 48 essentially includes (FIGS. 11 and 12) a tray-overturning shaft 49 extending along the axis C of the tunnel 7 and driven by a motor 50 (FIG. 1).

Figure 1:
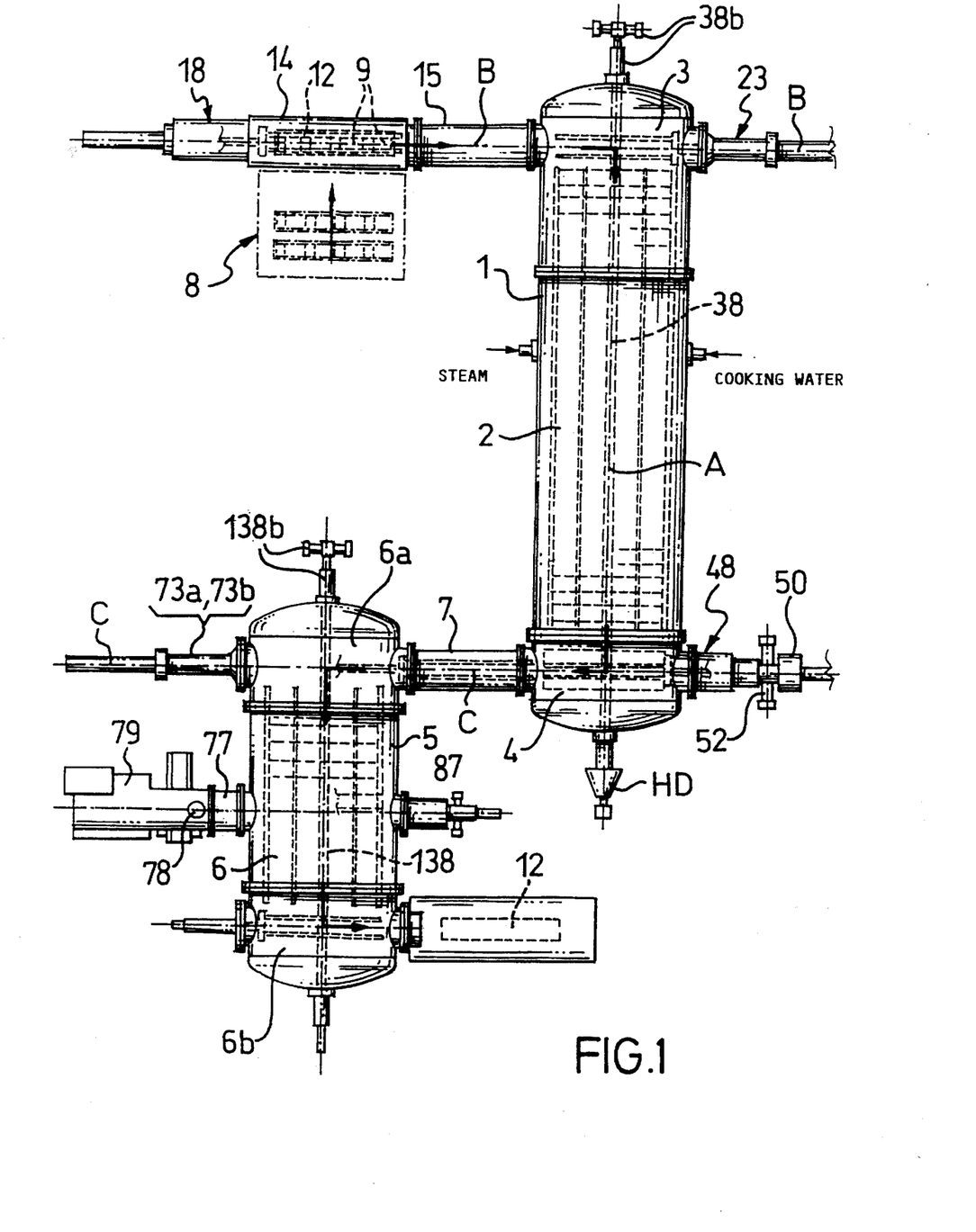
FIG. 1 is a schematic general plan of a plant for the production of ready-to-eat meals according to the present invention.
Figure 2:
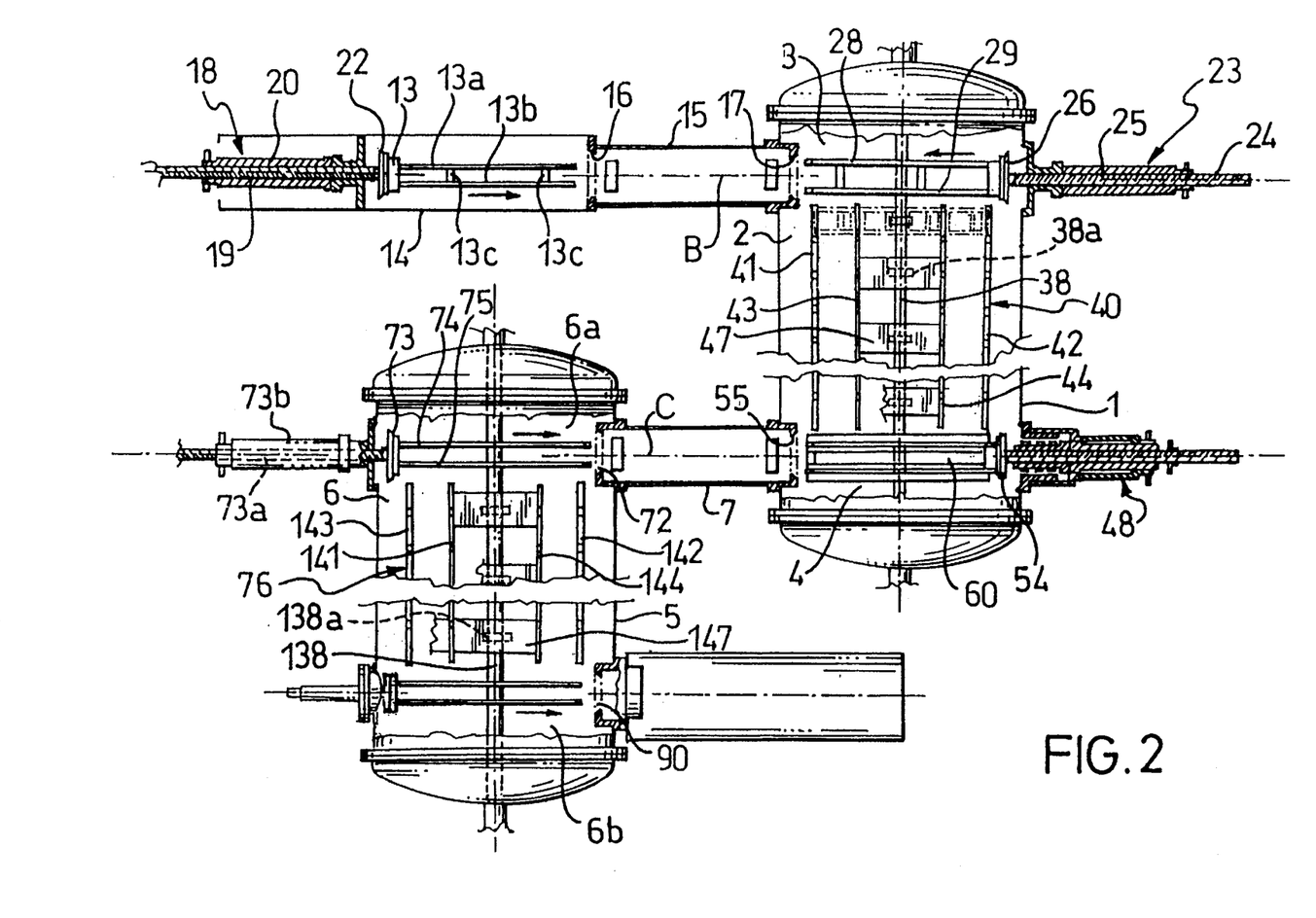
FIG. 2 is the general plan of FIG. 1 on an enlarged scale and partly cut away.

The shaft 49 is hollow and contains a sleeve element 51 mounted coaxially and rotatably therein and arranged to receive drive from drive means schematically indicated 52 (FIGS. 1, 2). A screw 53 is engaged in the sleeve element 51 with an end portion 53a projecting into the region 4 of the body 1.

An obturator disc 54 is fixed coaxially to the end 53a of the screw 53 and is structured and dimensioned to engage a valve seat aperture 55 formed in the communication passage between the outlet region 4 of the body 1 and the tunnel 7 (FIG. 2) to form a pressurised fluid-tight seal.

Figure 12:
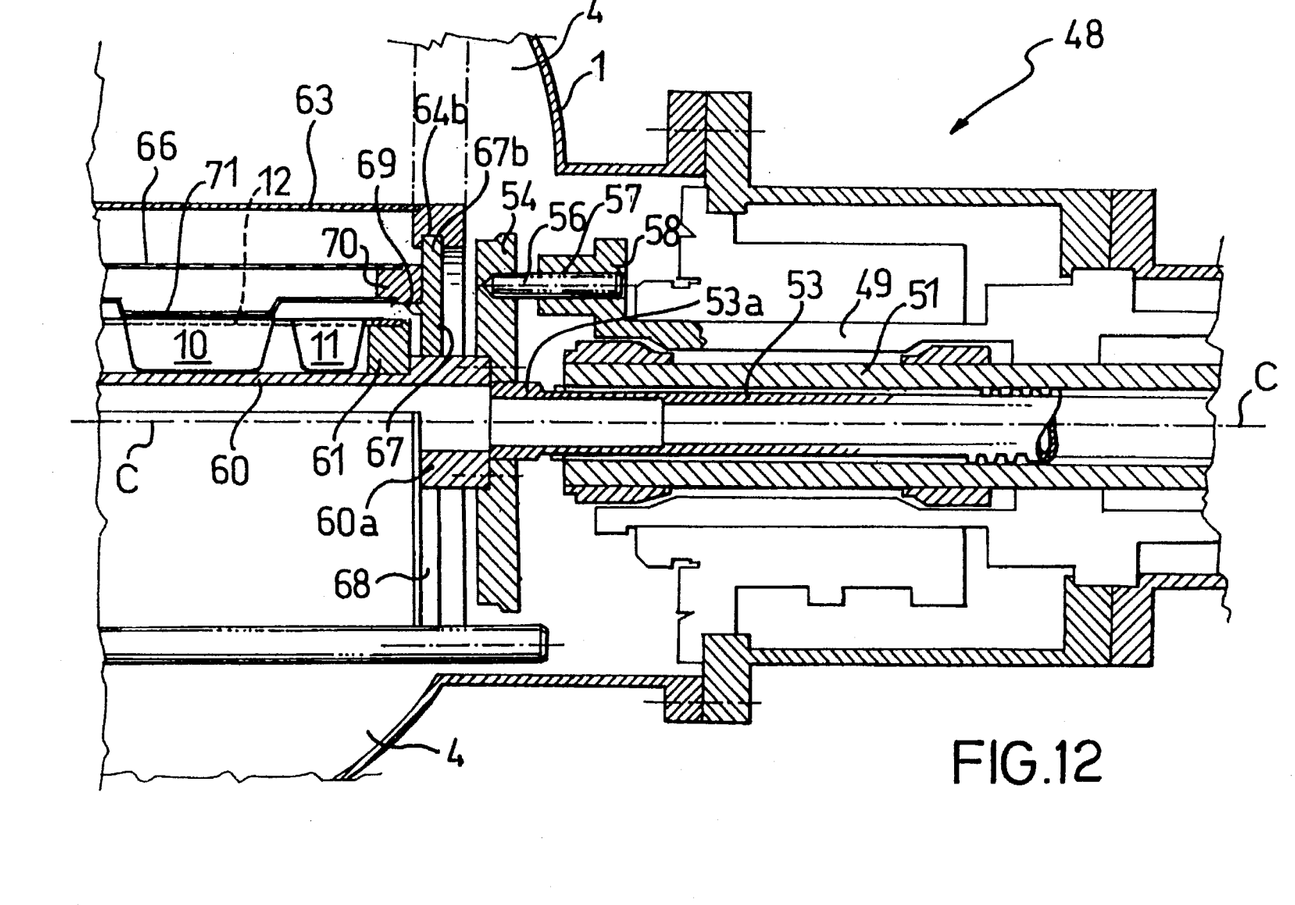
FIG. 12 is an enlarged cross-section of a detail of FIG. 11.

With reference to FIG. 12, a pin 56 is fixed to the face of the obturator disc 54 facing outwardly of the body 1 and slidably engages a corresponding cylindrical seat 57 in a carrier member 58 mounted coaxially on (or otherwise fixed to) the hollow shaft 49 for rotation therewith.

To the other face of the obturator disc 54, facing into the body 1, is fixed a square hub 60a of a straight arm 60 which extends parallel to the axis C and to one side of it and up to a position close to the valve seat aperture 55 of the tunnel 7.

At each end, the arm 60 (FIGS. 11 and 12) has a respective projection 61, 61a dimensioned to support a tray 12 without the associated containers 9 coming into contact with the arm 60.

A cage structure 62 is supported in the outlet region 4 of the body 1, over the arm 60 and with its axis parallel to the axis The cage 62 is preferably made from perforated sheet metal and includes a cylindrical sleeve 63, not entirely closed on itself due to the presence of an opening 62a facing the arm 60 and extending the entire length of the sleeve 63, the sleeve being reinforced at each end by a respective incomplete ting 64, 64a. The cage structure 62 can be moved towards or away from the arm 60 by a pneumatic cylinder 65 (or any similar actuator) supported by the body 1 with its axis vertical.

A second cylindrical cage structure 66, similar to the cage structure 62, is mounted therein and is fixed for translation therewith but is freely rotatable relative thereto. The cage structure 66 also has an incompletely closed cylindrical sleeve and opposite end walls 67, 67a. These end walls have respective square windows 68, 68a each opening downwardly into the circumference of the respective end wall and dimensioned to couple respectively with the square hub 60a of the arm 60 and with the projection 61a thereof.

It should be noted that the diameter of the end walls 67, 67a is greater than that of the cylindrical sleeve of the cage structure 66 so that these walls form projecting annular flanges 67b (FIG. 12). The flanges 67b are slidably engaged in respective guides 64b formed in the circumference of the rings 64, 64a of the cage structure 62 and this engagement couples the two cage structures 62 and 66 together.

The end walls 67, 67a have respective flat brackets 69 (69a) each projecting axially into the cage structure 62 in such a position that, when the square window 68 (68a) engages the square hub 60a, the short sides of a tray 12 supported on the arm 60 are held between the brackets 69, 69a and the projections 61, 61a of the arm itself.

A rectangular frame 70, made for example of flat metal profiled sections, is supported in the cage structure 66 for translation and rotation therewith; in a preferred but non-limitative embodiment, the short sides of this frame are fixed to the brackets 69, 69a and it provides support for a plurality of pasta strainers 71, positioned and dimensioned so as to fit downwardly onto the containers 9 (10) in a tray 12.

In one variant, not illustrated, the plurality of strainers 71 is supported by a single rod extending longitudinally inside the cage structure 66 and fixed to its opposite end walls.

The tunnel 7(FIG. 2) communicates with the inlet end 6a of the chamber 6 of the body 5 through a valve seat aperture 72; an obturator disc 73 cooperates with this aperture 72 and is fixed coaxially to the free end of a screw 73a actuated by a suitably driven, threaded sleeve 73b which extends along the axis C, being rotatably supported outside the body 5 in a position opposite the tunnel 7.

A pair of tines 74, 75 is fixed to the face of the obturator disc 73 facing the valve seat 72, these tines 74, 75 being reinforced and spaced so as to accommodate the arm 60 between them.

A stepping conveyor, generally indicated 76, operates in the chamber 6 of the body 5. Neither the conveyor 76 nor its drive means will be described in detail here as they are the same as the conveyor 40 and its drive means, described with reference to the body 1.

The components of the conveyor 76, which are the same as those of the conveyor 40, are identified by the same reference numerals increased by 100.

About half-way along the body 5, the chamber 6 defined therein communicates (FIG. 1) through a tubular passage 77 with a further chamber defined by a further body 79 fixed to the side of the body 5 and extending parallel to the tunnel 7.

A dispenser-meterer 78 for sauces or other condiments is mounted over the tubular passage 77 in communication with its interior, this passage 77 being sealed both to the body 5 and to the body 79 by appropriate flanges and seals.

A closure assembly, not shown as it is of known conventional type, operates in the body 79 to seal, under sterile conditions, the containers 9 which arrive regularly from the chamber 6 of the body 5 as described below.

For this transfer, an expulsion assembly 81 (FIG. 13) is arranged in the chamber 6 under the conveyor 76 for releasing the containers 9 from their respective trays 12.

Figure 13:
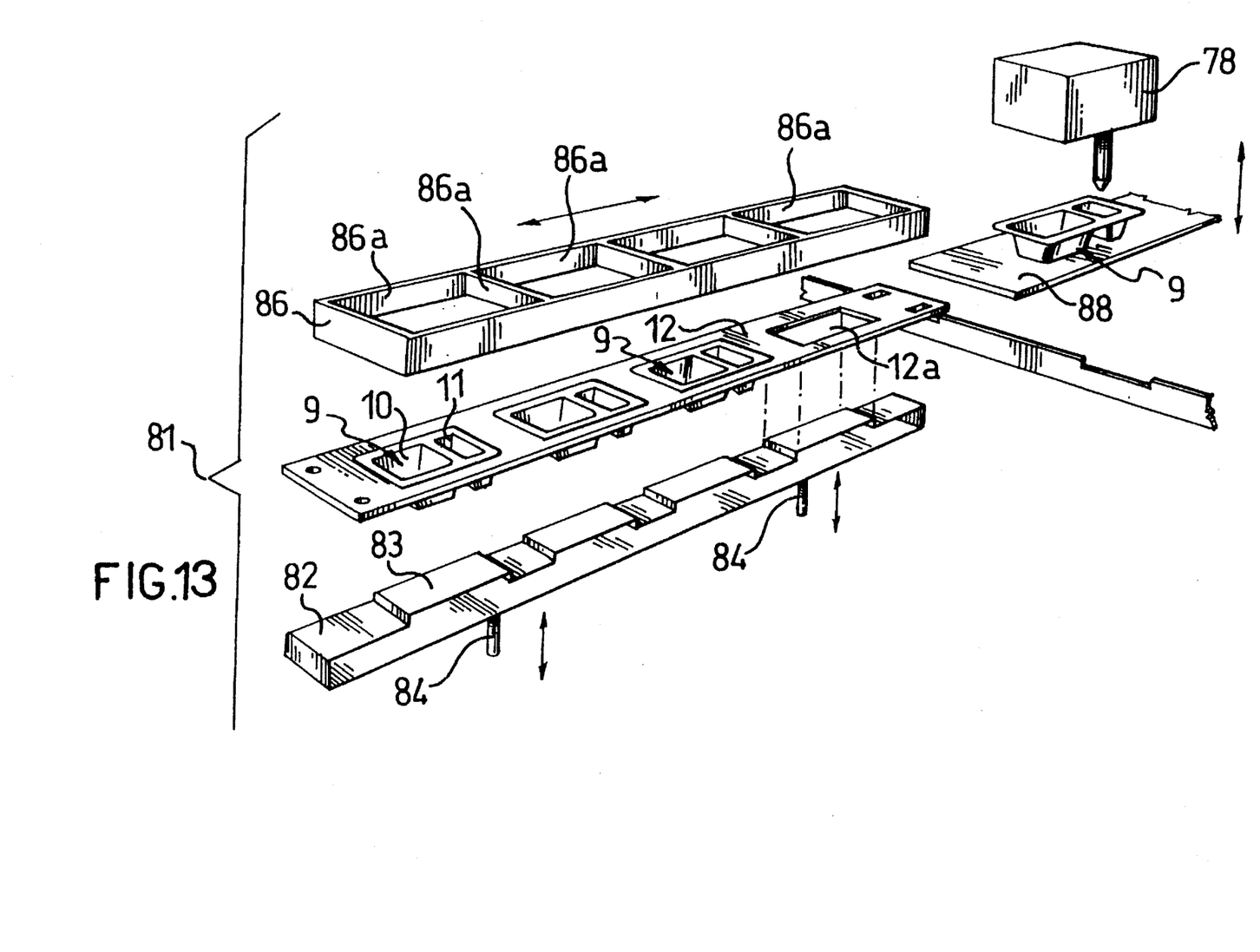
FIG. 13 is a schematic perspective view of a device according to the present invention for removing dishes from their respective trays.

This assembly 81 comprises essentially a horizontal, rectangular element 82 having the same transverse dimensions as the trays 12; this element 82 has a plurality of parallelepipedal projections 83 of such a thickness that they can engage the windows 12a provided to accommodate the containers 9.

The rectangular element 82 is mounted on a plurality of rods 84 which are movable vertically by mechanical actuators, known per se.

It should be noted that, when the projections 83 of the element 82 have engaged the windows 12a in a tray 12 to "expel" the respective containers 9, they form a continuous support plane with the tray 12 on which the containers 9 may be moved (sliding) without hindrance.

A rectangular grid 86 with large rectangular openings 86a is supported above the conveyor 76 so as to extend parallel to the element 82.

Each opening 86a is dimensioned so as to surround a container 9. The grid 86 is movable transverse the direction in which the conveyor 76 advances.

The drive means for the grid are outside the body 5 and are not shown as they are entirely conventional.

By means of these drive means, the grid 86 and the plurality of containers 9 engaged in its openings 86a may be moved laterally off the conveyor 76 onto a shelf 88 extending through the tubular passage 77 where the dispenser 78 delivers sauces or other similar condiments under sterile conditions.

This shelf 88 is aligned with the working plane of the closure assembly towards which the containers 9 full of cooked food and the appropriate sauce are conveyed to be sealed as described later.

The trays 12, once relieved of the containers 9, are carried by the stepping conveyor 76 towards the outlet region 6b of the chamber 6 where they are ejected through an aperture 90, for example by a pusher 90a.

The plant of the invention operates as follows. In a starting condition, the obturator disc 22 and the pusher arm 13 fixed thereto are positioned in the tray-reception chamber 14. The air-lock chamber 15 is open to the chamber 14 but is hermetically sealed from the chamber 2, or rather from the inlet region 3 thereof, as a result of the engagement of the obturator disc 26 with the valve seat aperture 17. The tines 28, 29 of the disc 26 are positioned in the air-lock chamber 15.

The tunnel 7 is closed both from the chamber 2, or rather from the outlet region 4 thereof, and from the inlet region 6a of the chamber 6 as a result of the engagement of the obturator discs 54 and 73 with the respective valve seat apertures 55 and 72. The tines 74–75 of these obturator discs are positioned in the tunnel 7.

The description which follows is provided with reference to a single tray 12 carrying four containers 9, the larger compartments 10 of which hold measured quantities of a preselected pasta.

In the chamber 14, the tray 12 under consideration is positioned on the arm 13. Under the action of the lead-screw assembly 18, the arm 13 and the tray 12 supported thereon are advanced towards the air-lock chamber 15.

As soon as the tray 12 enters the air-lock chamber 15, its front short side encounters the idle rollers 30 and 3 1 of the tines 28, 29 (FIGS. 4–8). As the arm 13 continues to advance between the tines 28, 29, the tray 12 is gradually lifted off the said arm and rested on the tines. Subsequently, when it nears the obturator disc 26, the front short side of the tray 12 encounters the teeth 32 and 33 which immediately thereafter engage the slots 34, 35 in the tray 12. This engagement completes the transfer of the tray 12 from the arm 13 to the tines 28, 29 and the obturator disc 22 simultaneously seals the corresponding valve seat aperture 16 hermetically, sealing the air-lock chamber 15.

The lead-screw assembly 18 is stopped while the lead-screw assembly 23 is activated and moves the obturator disc 26 away from the respective valve seat aperture 17. This movement continues until the tines 28, 29 and the tray 12 they are supporting are fully inside the processing chamber 2.

At this point, the stepping conveyor 40 is started and, in a first step, moves the movable profiled members 43, 44 horizontally towards the tray 12. With this movement, the movable profiled members 43 and 44 engage the notches 36, 37 in the tines 28, 29, being inserted under the tray 12. Subsequently (second step) the movable profiled members 43, 44 are lifted, carrying the tray 12 away from the tines 28 and 29. The subsequent horizontal displacement (in the direction opposite that previously considered) and downward displacement of the stepping conveyor 40 complete its cyclic rectangular movement and, at the same time, the tray 12 is laid on the fixed profiled members 41, 42 of the conveyor itself. At this point, the tines 28, 29 are returned to the air-lock chamber 15 which the obturator disc 26 seals again. Once this is sealed, the pusher-arm 13 may be returned to the chamber 14 to collect another tray 12 with its containers 9.

As the conveyor 40 continues to operate, the tray 12 is advanced stepwise towards the outlet region 4 of the chamber 2.

During this passage, the pasta contained in the various containers 9 is first pasteurised (and/or sterilised) by the steam delivered through the ducts 39a; it is then cooked by the boiling water delivered through the ducts 39. Obviously the time that the pasta remains under the ducts 39 delivering boiling water coincides with the cooking time of the pasta selected.

By movements exactly the reverse of those described for the collection of the tray 12 from the tines 28, 29, the conveyor 40 delivers the tray 12 and its containers of cooked pasta to the arm 60.

The cages 62 and 66 are lowered towards the arm 60 and the associated tray 12 by means of the pneumatic cylinder 65. The cages are lowered until the square aperture 68 in the flat bottom 67 of the second cage 62 engages the square hub 60a of the arm 60 with square coupling. At this point, the cage 66 is securely fixed for rotation with the arm 60 while the flat brackets 69, 69a of the cage hold the tray on the arm itself. In addition, pasta strainers 71 are positioned over the compartments containing the cooked pasta and the cooking water.

Rotation of the shaft 49 next causes an equivalent rotation (overturning) of the arm 60 and, with it, the tray 12 in the cage 66 and the associated pasta strainers, thereby straining the pasta. When the arm 60 has returned to its starting position and the cooking water has been strained from the cooked pasta, rotation of the shaft 49 is stopped and the cages 62 and 66 are raised simultaneously.

The lead-screw assembly constituted by the screw 53 and threaded element 51 is then started and moves the arm 60 and the tray it supports into the tunnel 7. At the end of this movement, the arm 60 is entirely inside the tunnel 7 while the obturator disc 54 seals the corresponding valve seat aperture 55.

On entering the runnel 7, the front short side of the tray 12 encounters the idle rollers of the tines 74 and 75 which gradually raise the tray 12, causing it to be transferred from the arm 60 to the said tines.

When this transfer is completed, the lead-screw assembly (73a–73b) is started and the obturator disc 73, the pair of tines 74, 75 and the tray 12 supported thereon are moved into the chamber 6.

The cooling chamber 6 thus communicates with the tunnel 7 which is hermetically sealed from the processing chamber 2 (outlet end 4) by the engagement of the obturator disc 54 with the valve seat aperture 55.

Once it is in the chamber 6, the tray 12 is collected by the conveyor 76 and advanced towards the centre of the chamber, the obturator disc 73 is returned to close the respective valve seat 72 and the pusher arm 60 remains in its starting position with the obturator disc 54 closing the seat 55.

The expulsion assembly 81 operates in the centre of the chamber 6 to release the containers 9 from the tray 12 and to move them one at a time onto the shelf 88, which extends laterally of the conveyor 76, perpendicular thereto, where a portion of sauce may be loaded into each compartment 11.

Once the correct quantity of sauce has been measured into the compartment 11 of the last container 9, the tray 12, emptied of containers, advances towards the outlet end 6b of the chamber 6. The containers 9 are pushed through the passage 77 into the chamber 79 where the closure assembly seals them under sterile conditions.

The tray 12, emptied of the containers, is ejected from the chamber 6 by a pusher 90a which may be actuated either pneumatically or mechanically.

We claim:

1. An apparatus for the production of ready-to-eat cooked meals, comprising:
    an autoclave body defining a food-processing chamber having an inlet end for food to be cooked and measured into open containers and an outlet end for the food; there being, in succession, between the inlet and outlet ends:
    a) a first region which includes means for dispensing steam for the heat stabilisation and sterilisation of the food and of the said containers into which the food is measured,
    b) a second region which includes means for delivering a liquid for cooking the food in the respective containers,
    c) a straining region which includes a device for overturning the said containers for removing the cooking liquid from the cooked food while retaining the latter in the respective containers,
    a conveyor inside the said autoclave body for transferring the said containers from the said inlet end to the said outlet end of the processing chamber, through the said first, second, and straining regions
    first and second air-lock chambers fitted to the side of the said autoclave body and communicating with the inlet end and the outlet end respectively of the said processing chamber through corresponding apertures provided with valve members,
    first and second means for transferring the said containers, loaded with food, from the said first air-lock chamber to the said inlet end of the processing chamber and from the outlet end thereof to the said second air-lock chamber respectively,
    a sterile food-cooling chamber communicating with the said second air-lock chamber through an aperture provided with on/off valve means,
    a closure assembly for hermetically sealing the said containers, operative in a sterile environment communicating with the said sterile cooling chamber,
    means for transferring the said containers from said second air-lock chamber to said cooling chamber and from there to the said closure assembly.

2. An apparatus according to claim 1, in which an end of the said first air-lock chamber opposite said autoclave body communicates with a reception chamber for the open containers through an aperture provided with on/off valve members, means being provided for transferring said containers from the said reception chamber to the said first air-lock chamber.

3. An apparatus according to claims 2, wherein a plurality of the said containers is arranged in at least one line on a support tray.

4. An apparatus according to claim 3, wherein each container comprises a dished body surrounded by a flat, outwardly projecting border.

5. An apparatus according to claim 4, wherein said support tray comprises a plate-like element with a plurality of windows arranged in at least one line and dimensioned so as to be engageable by the dished bodies of the said containers.

6. An apparatus according to claims 3, wherein each of the means for transferring said containers includes a pusher-arm of a width and length substantially equal to those of the said tray and means for removably retaining said tray on the said pusher-arm, drive means being provided for reciprocating the said pusher-arm between the said first air-lock chamber and the inlet end of the said processing chamber and between the outlet end thereof and the said second air-lock chamber.

7. An apparatus according to claim 6, wherein said drive means each include a lead-screw assembly with a rotatable threaded sleeve element.

8. An apparatus according to claim 7, wherein said pusher-arm is fixed to said screw.

9. An apparatus according to claim 1, wherein said conveyor is of a stepping type.

10. An apparatus according to claim 9, wherein said conveyor includes means for removably retaining thereon a plurality of trays, mutually spaced and extending transverse the direction of advance of said conveyor.

11. An apparatus according to claim 10, wherein each of said containers is supported and guided by said conveyor only at either end.

12. An apparatus according to claim 1, wherein said means for dispensing steam is supported under said conveyor in the said processing chamber.

13. An apparatus according to claim 1, wherein said means for delivering a cooking liquid are supported above said conveyor inside the said processing chamber.

14. An apparatus according to claims 3, wherein the said overturning and straining assembly includes an arm supported for rotation in the said processing chamber and extending transverse thereof, this arm having means for removably retaining at least one tray with its containers, a plurality of strainers being supported above this arm and guided for movement towards and away from the said arm within the said processing chamber, means for moving said strainers from an operative position in which they engage the respective containers on the said arm into a rest position spaced therefrom, and means for fixing the said strainers for rotation with said arm.

15. An apparatus according to claim 14, wherein the said arm extends through the said processing chamber on the axis of the said aperture for communication between the outlet end of the processing chamber, and the said second air-lock chamber.

16. An apparatus according to claim 14, wherein above the said arm, the overturning and straining assembly includes a first cage structure with a cylindrical sleeve not completely closed on itself due to the presence of an opening along its length and facing said arm, a second cylindrical cage structure mounted coaxially in the said first cage structure for rotation relative thereto but fixed for translation therewith, said second cage structure having opposite end walls with support means for the said strainers.

17. An apparatus according to claim 16, wherein at least one of the said opposite end walls of the second cage structure has a square window opening into the circumference of the end wall for engagement with a square hub of the said arm.

18. An apparatus according to claim 16, wherein said end walls of the said second cylindrical cage structure have a diameter greater than that of the second cylindrical cage structure so that they form circumferential flanges, these flanges being slidably engaged in respective guides formed in rings provided to reinforce the ends of the said sleeve of the said first cylindrical cage structure.

19. An apparatus according to claim 1, wherein a stepping conveyor extends through the said cooling chamber from the inlet end to the outlet end thereof.

20. An apparatus according to claim 1, wherein said cooling chamber communicates with the sterile closure assembly through a tubular passage in which a dispenser-meterer unit is arranged to dispense sauces and similar condiments.

\* \* \* \* \*